UNITED STATES PATENT OFFICE.

GEORGE ARCHBOLD, OF NEW YORK, N. Y., ASSIGNOR OF ONE-HALF TO WILLIAM SETON GORDON, OF SAME PLACE.

COMPOSITION OF MATTER AS SUBSTITUTE FOR WOOD, &c.

SPECIFICATION forming part of Letters Patent No. 570,361, dated October 27, 1896.

Application filed July 13, 1896. Serial No. 598,988. (No specimens.)

*To all whom it may concern:*

Be it known that I, GEORGE ARCHBOLD, of New York, in the county and State of New York, have invented certain new and useful Improvements in the Manufacture of a Composition of Matter as a Substitute for Wood, &c., of which the following is a full, clear, and exact description.

The object of the invention is to provide certain new and useful improvements in the manufacture of a composition of matter, designed as a substitute for wood, completely fire and water proof and adapted to be readily shaped into any desired form.

The invention consists principally of a mixture of wood fiber, hydrate of alumina, sulfate of ammonia, and a binding substance, such as glue or gluten.

In order to prepare the composition of matter, I proceed in detail as follows: With, say, about one hundred pounds of wood fiber in ordinary pulp condition or containing, say, ten degrees of water I mix about fifteen pounds of a hydrate of alumina, such as gibbsite ($Al_2O_3 3H_2O$) or bauxite, ($Al_2O_3 2H_2O$,) to thoroughly incorporate with the wood fiber. In order to do this properly, I prefer to agitate the mixture in an ordinary beater. The hydrate combines partly mechanically with the pulp and renders it non-inflammable. One or more pounds of sulfate of ammonia dissolved in two gallons of water is then added to the mass, and the latter is again subjected to a beating, so as to form a gelatinous mass. The sulfate converts the aluminium hydrate into colloid form, and thus promotes its absorption by the wood fiber. A suitable binding substance is then added to the gelatinous mass, preferably about a pound of glue dissolved in water, or vegetable gluten and one ounce of bichromate of potash dissolved in water.

The mixture is agitated, so that all the ingredients are thoroughly incorporated in the pulp, so that the latter is reduced to a plastic state, which will permit of readily molding the mass into any desired form. Instead of the gluten above referred to I may use twenty-five per cent. of dry starch feed as a substitute.

"Dry starch feed " is a term used to describe the gluten and fiber of the cereal used in the manufacture of starch after the starch has been removed.

Gibbsite containing two per cent. of phosphate of alumina gives excellent results when used instead of the gibbsite previously mentioned, and the ordinary native phosphate of alumina found in large quantities in various parts of the country, and at present of very little commercial value, can be used in place of the gibbsite, especially when the said phosphate of alumina is reduced to a fine state and calcined previous to mixing it with the pulp.

In case the article to be molded is to have a vitreous surface, then an addition of a mixture of native magnesite and a solution of chlorid of magnesia in varying proportions is made, according to the degrees of hardness desired to be given to the finished article. The mass thus produced is especially serviceable for molding cups and like articles intended to take the place of pottery.

The ordinary sulfate of alumina and caustic ammonia may be mixed with the wet pulp instead of the gibbsite.

It will be seen from the foregoing that the material used in connection with the pulp can be had at a very low cost, as most of the same has very little, if any, commercial value at present, and hence I am enabled to produce an artificial material at a very low cost.

It will further be seen that from the nature of the ingredients employed I am enabled to readily form any desired article, and after the drying, setting, and hardening of the mass the latter can be readily cut with suitable tools, the same as ordinary wood, and without danger of injuring the tools employed.

As an equivalent of the hydrated alumina above referred to I may make use of decomposed mica containing as one of its principal constituents alumina.

Having thus described my invention, I claim as new and desire to secure by Letters Patent—

1. A composition of matter, consisting of a mixture of wood fiber, hydrate of alumina, sulfate of ammonia, and a binding substance, substantially as described.

2. A composition of matter, consisting of a mixture of wood fiber, gibbsite, sulfate of ammonia, and a binding substance, substantially as described.

3. A composition of matter, consisting of a mixture of wood fiber, gibbsite, sulfate of ammonia, and glue as a binding substance, substantially as described.

GEORGE ARCHBOLD.

Witnesses:
THEO. G. HOSTER,
JNO. M. RITTER.